United States Patent
Saaranen

(10) Patent No.: US 9,815,524 B2
(45) Date of Patent: Nov. 14, 2017

(54) FLOATING CONSTRUCTION

(71) Applicant: Waterbox Oy, Lahti (FI)

(72) Inventor: Juha Saaranen, Haukipudas (FI)

(73) Assignee: Waterbox OY, Lahti (FI)

( * ) Notice: Subject to any disclaimer, the term of this patent is extended or adjusted under 35 U.S.C. 154(b) by 39 days.

(21) Appl. No.: 14/899,571

(22) PCT Filed: Jun. 19, 2013

(86) PCT No.: PCT/FI2013/050669
§ 371 (c)(1),
(2) Date: Dec. 18, 2015

(87) PCT Pub. No.: WO2014/202820
PCT Pub. Date: Dec. 24, 2014

(65) Prior Publication Data
US 2016/0137264 A1    May 19, 2016

(51) Int. Cl.
*B63B 13/00* (2006.01)
*B63B 35/73* (2006.01)
*B63C 11/49* (2006.01)
*B63B 35/44* (2006.01)

(52) U.S. Cl.
CPC .............. *B63B 13/00* (2013.01); *B63B 35/73* (2013.01); *B63C 11/49* (2013.01); *B63B 2035/4426* (2013.01); *B63B 2207/02* (2013.01); *B63B 2207/04* (2013.01)

(58) Field of Classification Search
CPC . B63B 13/00; B63B 2035/4426; B63B 35/73; B63B 43/06; B63B 2207/02; B63B 2207/04; B63C 11/48; B63C 11/49
See application file for complete search history.

(56) References Cited

U.S. PATENT DOCUMENTS

| | | | | |
|---|---|---|---|---|
| 3,240,186 A * | 3/1966 | Dobell | .................. | A01K 61/60 114/66 |
| 4,854,256 A * | 8/1989 | Hayashi | .................. | B63B 35/44 114/61.1 |
| 5,009,188 A * | 4/1991 | Yasui | .................. | A01K 63/003 119/245 |
| 9,289,664 B2 * | 3/2016 | Lykov | .................. | A63B 69/00 |

FOREIGN PATENT DOCUMENTS

| | | |
|---|---|---|
| CN | 202863732 U | 4/2013 |
| DE | 19811492 A1 | 2/1999 |
| WO | 2014009591 A1 | 1/2014 |

* cited by examiner

*Primary Examiner* — Ajay Vasudeva
(74) *Attorney, Agent, or Firm* — Berggren Inc.

(57) ABSTRACT

A floating construction comprising a container filled fully or partially with water, the lower portion of the container being located within a surrounding body of water and the water surface level of the surrounding body of water being substantially lower than the water surface level inside the container, the container comprising transparent walls or walls with transparent sections and at least one open opening for entering the container, which at least one open opening is located below the surface level of the surrounding body of water, and which floating construction comprises space for spectators observing activities taking place inside the container, wherein the floating construction comprises at least one ballast tank, which ballast tank is connected to the container with a controllable pressure connection, and which ballast tank has controllable water connection to the surrounding body of water.

6 Claims, 1 Drawing Sheet

FLOATING CONSTRUCTION

Figure 1:
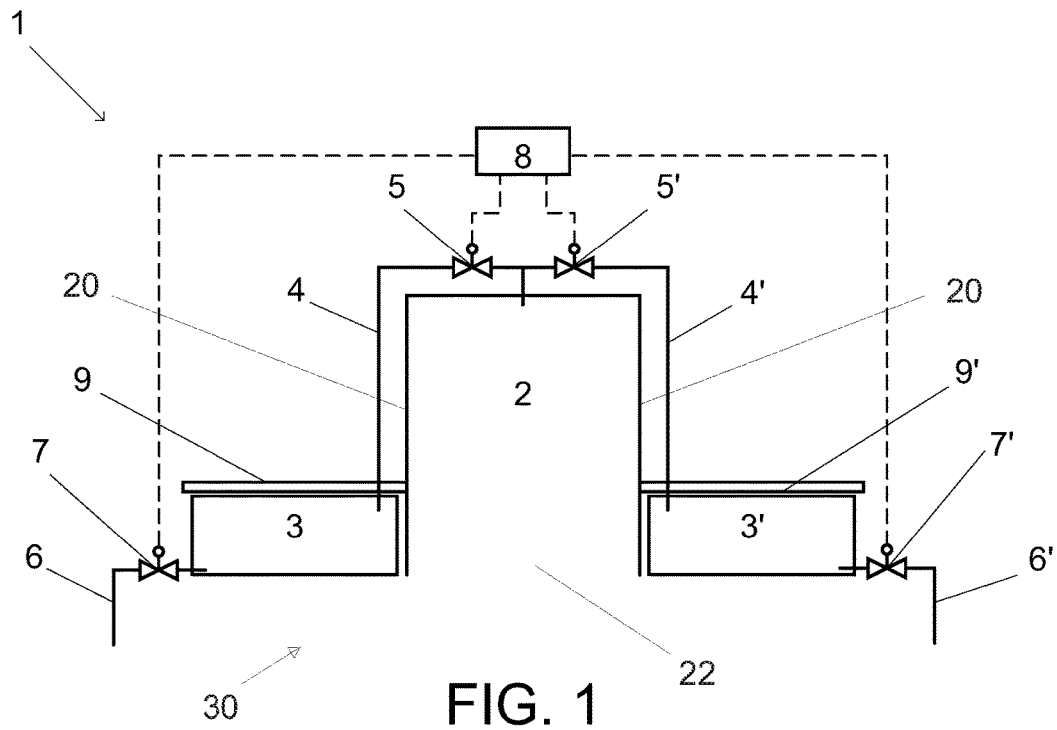

The present invention relates to a floating construction comprising a vessel or container filled fully or partially with water and the lower portion of the container is located within a surrounding body of water, wherein the walls of the container are transparent or contain transparent sections, and the container comprises one or more open openings for entering the container, which open opening or openings are located below surface level of the surrounding body of water, and the floating construction comprising a space for spectators for observing actions taking place in the container.

Patent application PCT/FI2012/050726 discloses an apparatus for underwater activities, which apparatus comprises a vessel or container filled fully or partially with water, which vessel comprises one or more open openings for entering the vessel, wherein the lower portion of the vessel is located within a body of water, all of the one or more open openings for entering the vessel are located in that portion of the vessel which is located under the surface level of the body of water, and the walls of the vessel are transparent, or the walls comprise sections that are transparent, for allowing observation of the activities taking place inside the vessel from outside of the vessel. One disclosed embodiment comprises a floating platform connected to this type of an apparatus, wherein the floating platform may be equipped with a space for spectators, including seating and other types of services for the spectators.

With this type of floating platform the water mass inside the container or vessel is significant, and causes problems for the floating construction and its structural integrity especially in situations where the water mass inside the container needs to be removed quickly.

The present invention provides a solution for emptying the water filled container within a floating construction safely, quickly and in controlled manner.

In the floating construction according to the present invention at least one ballast tank, which ballast tank has a water connection to the surrounding body of water, is connected to the container with a controllable pressure connection.

In the solution according to the present invention, when the pressure connection between the ballast tank or tanks and the container is opened, the water inside the container can escape from the container to the surrounding body of water, and the underpressure or vacuum created by the water escaping the container is used to fill the ballast tank. This way the water filling the ballast tank compensates the water escaping from the container.

In the context of the present invention a controllable pressure connection means suitable connection between the ballast tank or tanks and the container which connection, when closed allows a pressure difference between inner side of the ballast tank or tanks and inner side of the container, and when opened allows the pressure difference to equalize.

In the context of the present invention a controllable water connection between the ballast tank or tanks and the surrounding body of water means suitable connection allowing water from the surrounding body of water to enter and exit the ballast tank or tanks in controlled manner.

Both the controllable pressure connection and the controllable water connection may be implemented with pipe and control valve arrangement, for example.

In the floating construction of the invention, the container is filled fully or partially with water, which partial filling of the container means that inside the container there is sufficient amount of water to allow underwater activities to take place within the amount of water in the container, and allow these activities to be observed though the walls of the container. Thus the water surface level inside the container in operation condition is significantly higher than the water surface level of the surrounding body of water. This also means that the water, and possible remaining air, inside the container is in underpressure so that water remains inside the container and does not escape through the open opening(s) 22 located below the surface level of the surrounding body of water.

In the floating construction of the invention the pressure connection is advantageously located between the upper portion of the at least one ballast tank and the upper portion of the container. This embodiment allows faster equalization of the pressure difference, since the pressure difference is at maximum in the starting situation.

Advantageously in the floating construction according to the invention there is at least two substantially same sized ballast tanks located on opposite sides of the container, and both of the ballast tanks are connected to the container with a controllable pressure connection. Use of a plurality of ballast tanks allows faster emptying of the container, and equal filling of the ballast tanks which leads to more controlled emptying process of the container.

The floating construction according to the present invention may also comprise a pumping system, which can be used to control the amount of water inside the at least one ballast tank and/or inside the container.

The floating construction of the invention advantageously comprises a control system for controlling the controllable pressure connection and/or the controllable water connection, as well as other relating apparatuses, such as pumps, for example.

The features defining a floating construction according to the invention are more precisely presented in claim 1. Dependent claims disclose advantageous embodiments and features of the invention.

Figure 2:
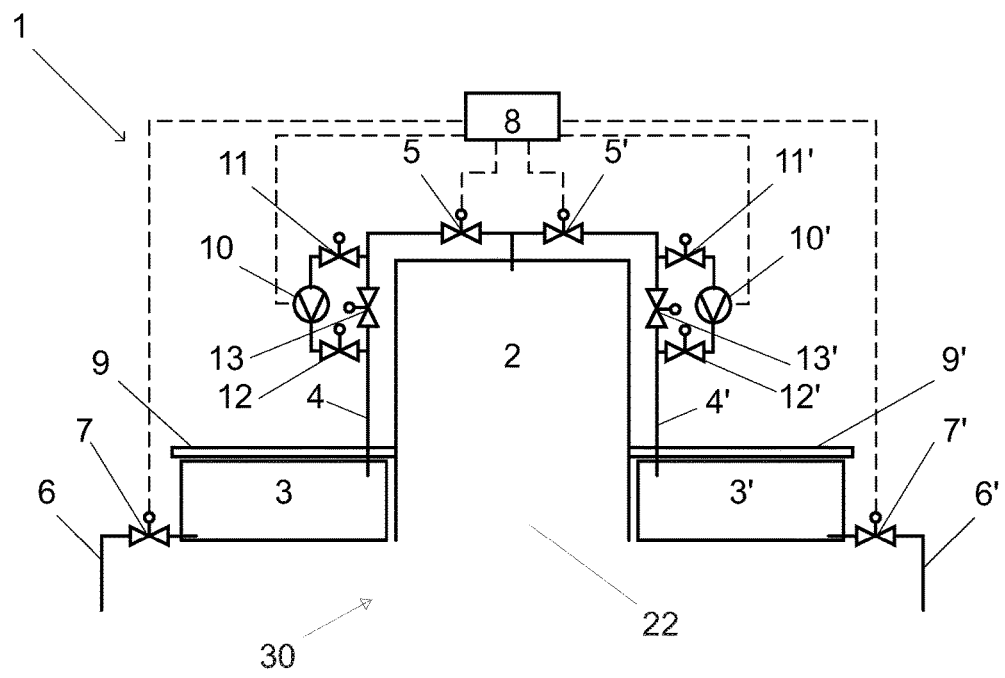

Exemplifying embodiments of the invention and their advantages are explained in greater detail below in the sense of example and with reference to accompanying drawings, where:

FIG. 1 shows schematically a cross-sectional view of an embodiment of the invention, and FIG. 2 shows schematically a cross-sectional view of an alternative embodiment of the invention.

FIG. 1 shows schematically a cross sectional view of a floating construction 1, which comprises a container 2 for water which container is air and watertight, with the exception of the open bottom surface (opening 22). On both sides of the container 2 is located ballast tanks 3, 3'. Upper portions of the ballast tanks 3, 3' are connected to the upper portion of the container through controllable pressure connection in form of pipes 4, 4' and controllable valves 5, 5', which controlled pressure connections connects the inner sides of the ballast tanks and the container. The ballast tanks 3, 3' are also equipped with controllable water connection to the surrounding body of water 30, when the floating construction 1 is floating in the body of water 30, in form of pipes 6, 6' and controllable valves 7, 7'. The controllable valves 5, 5' and 7, 7' are controlled with a control system 8.

On top of the ballast tanks 3, 3' and next to the container 2 is located a deck area 9, 9', from where spectators can observe activities taking place inside the container through transparent walls 20 of the container.

When the floating construction 1 is floating on a surrounding body of water 30 and in operating condition, the container 2 is full or substantially full with water and the lower edges of the side walls of the container are located below the surface level of the surrounding body of water. Further, the controllable valves 5, 5' are closed so that the water inside the container 2 remains inside the container and the surface level of the water inside the container remains substantially higher than the surface level of the surrounding body of water. In this operating condition, the ballast tanks 3, 3' are substantially empty in order to compensate the weight of the water-filled container 2.

When the container 2 needs to be emptied, controllable valves 5, 5' and 7, 7' are opened through the control system 8, and air from ballast tanks 3, 3' can enter to the upper portion of the container and thus lower the pressure difference between the container and the ballast tanks, which allows the water escape from the container through the open bottom surface of the container to the surrounding body of water 30, and the surface level of the water inside the container lowers quickly.

The underpressure created inside the ballast tanks 3, 3' by the opening of the controllable valves 5, 5' forces water to enter to the ballast tanks though pipes 6, 6' and open controllable valves 7, 7'. This way the weight of the water entering to the ballast tanks 3, 3' compensates the weight of the water escaping from the container 2.

FIG. 2 shows schematically a cross-sectional view of an alternative embodiment of the invention, where the embodiment of FIG. 1 is equipped with pumps for filling the container 2 with water.

In the embodiment of FIG. 2, pumps 10, 10' are located on a bypass lines attached to the pipes 4, 4'. The pumps 10, 10', and the bypass line system, especially controllable valves 11, 11', 12, 12' and 13, 13', are controlled with the control system 8.

When the container 2 of the floating construction 1 is filled, the controllable valves 5, 5', 11, 11' and 12, 12' are opened, and controllable valves 13, 13' are closed to allow air to move through the bypass line and pumps 10, 10', which pumps are vacuum pumps. Further, the controllable valves 7, 7' are also opened. Then the pumps 10, 10' are activated, and they start to suck air from the container 2, and thus create underpressure inside the container, through their suction sides, and blow air to the ballast tanks 3, 3', and thus create overpressure inside the ballast tanks, through their delivery sides.

The underpressure inside the container 2 causes the water surface level to raise inside the container and water to enter the container, and the overpressure inside the ballast tanks 3, 3' causes the water inside the ballast tanks to escape through pipes 6, 6' and open controllable valves 7, 7' to the surrounding body on water. This way the emptying of the ballast tanks 3, 3' compensates the filling of the container 2.

Once the container 2 is filled, or the water surface level inside the container has reached sufficient height, the pumps 10, 10' are stopped and controllable valves 5, 5' and 7, 7' are closed, so that the pressure difference between the ballast tanks 3, 3' and the inside of the container 2 in preserved and water remains inside the container.

The specific exemplifying embodiments of the invention shown in figures and discussed above should not be construed as limiting. A person skilled in the art can amend and modify the exemplary floating construction described above in many evident ways within scope of attached claims. Thus the invention is not limited merely to the embodiments described above.

The invention claimed is:

1. A construction floating on a body of water and comprising:
    a container comprising transparent walls or walls with transparent sections, and at least one opening in its lower portion for water to enter the container from the body of water and to fill the container fully or partially;
    at least one ballast tank connected to the container with a controllable pressure connection allowing maintaining or releasing a pressure difference between inside of the at least one ballast tank and inside of the container, thereby allowing the water surface level inside the container to be maintained substantially higher than the water surface level of the surrounding body of water,
    said at least one ballast tank having a controllable water connection to the surrounding body of water allowing water from the body of water to enter and exit the at least one ballast tank in a controlled manner; and
    a space for spectators for observing activities taking place inside the container when fully or partially filled with water.

2. The floating construction according to claim 1, wherein the pressure connection is located between an upper portion of the at least one ballast tank and an upper portion of the container.

3. The floating construction according to claim 1, wherein the at least one ballast tanks is two substantially same sized ballast tanks located on opposite sides of the container, and both of the two ballast tanks are connected to the container with a controllable pressure connection.

4. The floating construction according to claim 1, wherein the floating construction comprises a pumping system for controlling the amount of water inside the at least one ballast tank and/or inside the container.

5. The floating construction according to claim 1, wherein the controllable pressure connection and/or the controllable water connection is implemented with pipes and controllable valves.

6. The floating construction according to claim 1, wherein the floating construction comprises a control system for controlling the controllable pressure connection and/or the controllable water connection.

* * * * *